July 27, 1926.  
T. CARROLL  
CASH REGISTER  
Filed March 26, 1920  
1,593,568  
6 Sheets-Sheet 1
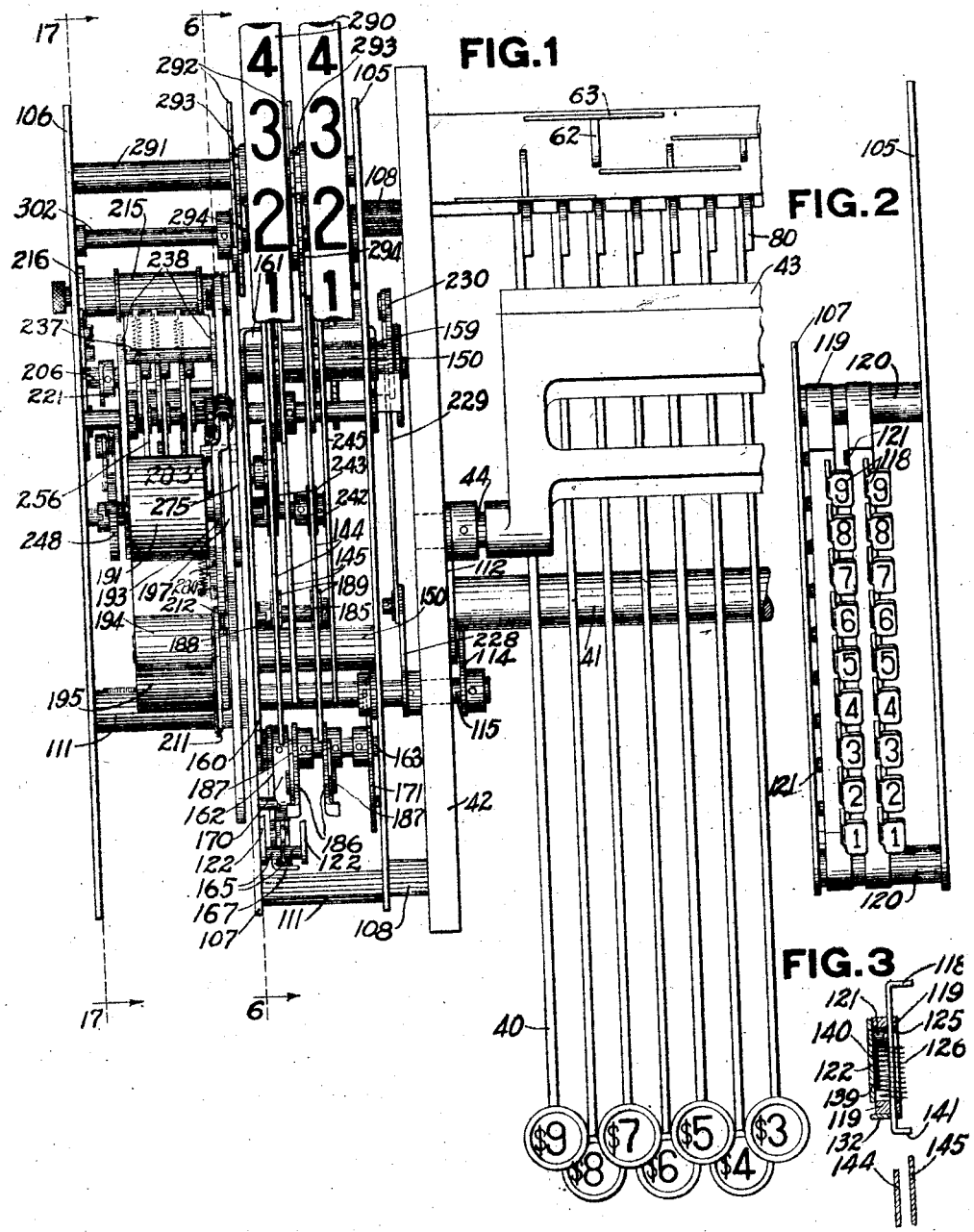
Inventor  
THOMAS CARROLL  
by Carl Brunt  
and Henry E. Stauffer  
Attorneys July 27, 1926.

T. CARROLL

CASH REGISTER

Filed March 26, 1920    6 Sheets-Sheet 2

1,593,568

Inventor
Thomas Carroll
By *Earl Beust*
*Henry E Stauffer*
his Attorneys

July 27, 1926.

T. CARROLL

CASH REGISTER

Filed March 26, 1920

Inventor
THOMAS CARROLL
by Earl Benst
and Henry E. Stauffer
Attorneys

July 27, 1926.
T. CARROLL
CASH REGISTER
Filed March 26, 1920
1,593,568
6 Sheets-Sheet 4
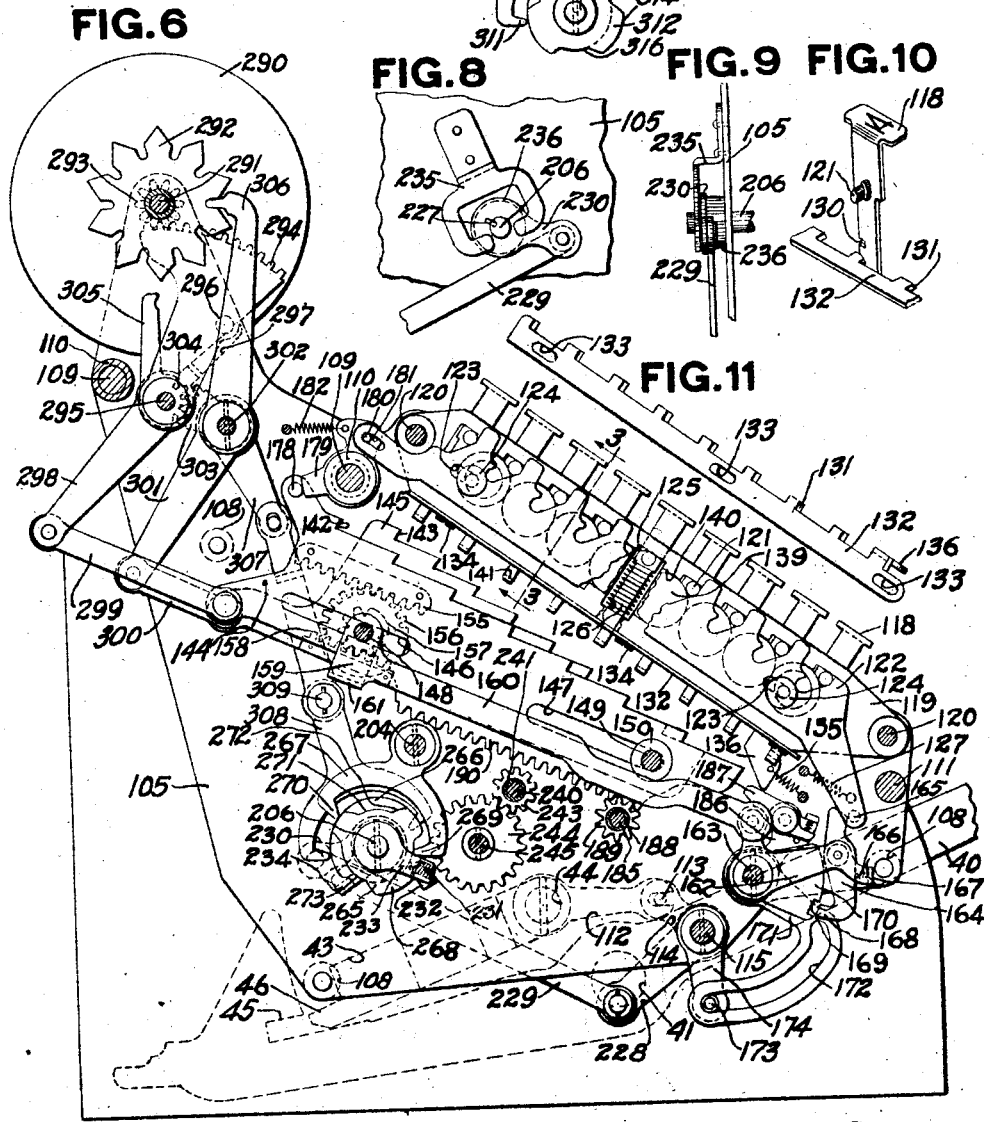
Inventor
THOMAS CARROLL
by Earl Beust
and Henry E. Stauffer
Attorneys July 27, 1926.  T. CARROLL  1,593,568

CASH REGISTER

Filed March 26, 1920  6 Sheets-Sheet 5

Inventor
Thomas Carroll
By
his Attorneys

July 27, 1926.

T. CARROLL 1,593,568

CASH REGISTER

Filed March 26, 1920    6 Sheets-Sheet 6

Inventor
Thomas Carroll
By
his Attorneys

Patented July 27, 1926.

1,593,568

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed March 26, 1920. Serial No. 368,869.

This invention relates to attachments for cash registers and the like and is more particularly adapted to be used in connection with the type of cash register shown and described in Letters Patent of the United States issued to Thomas Carney, No. 497,860, on May 23, 1893, and Letters Patent of the United States, No. 718,565, issued to Jos. P. Cleal on January 13, 1903.

The present device is shown adapted to a machine of the type illustrated in the above mentioned Carney and Cleal patents, said machine being constructed and operating substantially the same as the machines shown in these patents and particularly that in the Cleal patent. The purpose of this invention is to enable a merchant selling taxable goods to keep an account of goods sold and also to keep an accurate account of all money taken in as tax which is collected by the revenue department of the Government.

It is a further object of the present invention to provide indicators which indicate the amount of tax in addition to the regular indicators of the amount of the sale. If the goods sold are non-taxable the tax indicating elements will be rotated to indicate zero.

It is another object of the present invention to provide a detail and a total printing mechanism, the detail printing being done at each operation of the machine, and the total printing taking place only at such times as when the merchant may desire to know the standing of his tax totalizer, the latter being accomplished by a manually operated lever.

With these and incidental objects in view, the invention consists in certain novel features of construction and combinations of parts, the essential elements of which are set forth in the appended claims and a preferred form of embodiment of which is hereinafter described with reference to the drawings which accompany and form part of this specification.

Of said drawings:

Fig. 1 is a plan view of one end of the machine of the above mentioned Carney and Cleal type and also shows the connection and relation of the tax registering attachment in connection therewith, the keyboard for said attachment being removed to more clearly show the parts beneath.

Fig. 2 shows the key-board for the tax registering attachment.

Fig. 3 is a section on line 3—3 of Fig. 6, looking in the direction of the arrows.

Fig. 6 is a vertical sectional view on line 6—6 of Fig. 1, looking in the direction of the arrows.

Fig. 7 is a detail view of the indicator aligning cam and its operating arm, said arm being broken away.

Fig. 8 is a fragmentary view illustrating the means for rocking the cam shaft, and also showing the means for retaining the operating member in lateral position.

Fig. 9 is an end view of the mechanism illustrated in Fig. 8.

Fig. 10 is a detail perspective view of one of the tax keys and its retaining bar.

Fig. 11 is a detail view of the tax key retaining bar.

Described in general terms, the machine comprises two separate keyboards, one for registering the regular amounts of a sale and one for registering the amount of tax when taxable goods are sold. These keyboards are so arranged that for a transaction involving a tax the tax keys are first depressed, which merely set up certain conditions in the tax registering attachment, after which the regular amount keys are depressed whereby upon operation of said keys the mechanism in the tax registering attachment is caused to function under the control of the depressed tax keys whereby the proper tax in proportion to the regular amount is accumulated in the tax totalizer and said tax is printed upon a detail strip. The amount of the tax is also indicated by the tax registering attachment.

Amount registering mechanism.

Figure 4:
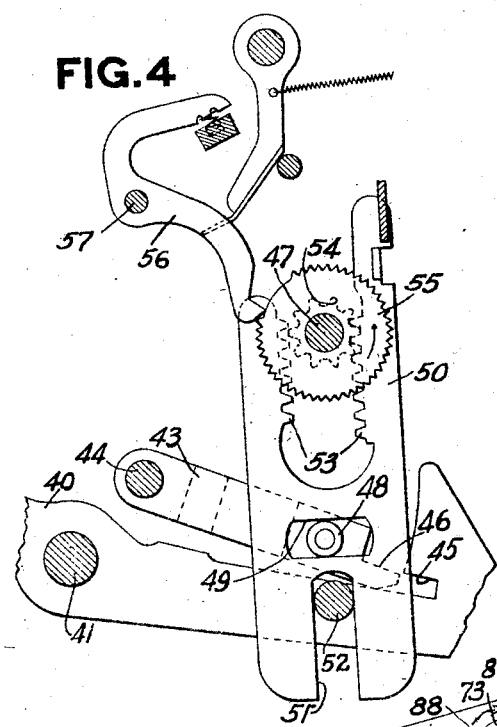
Fig. 4 is a detail sectional view, partly broken away, of the mechanism for rotating the common operating shaft.
Figure 5:
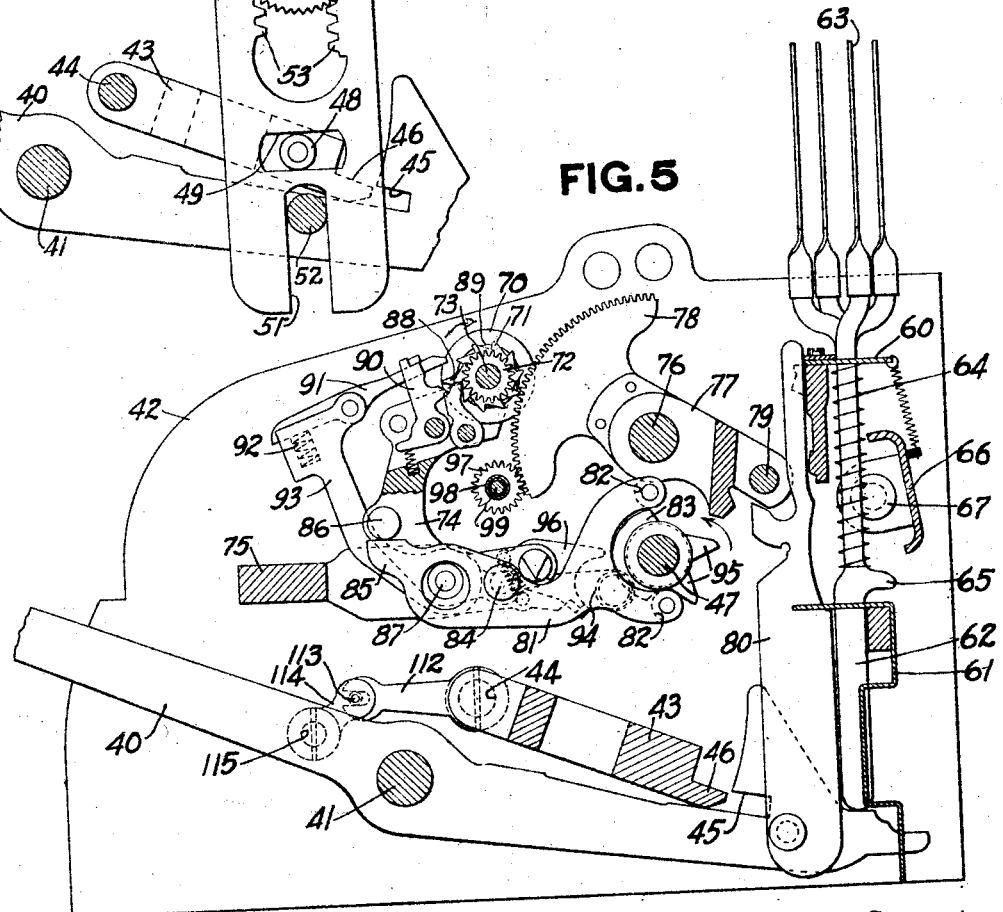
Fig. 5 is a vertical sectional view through a machine of the type described in the above mentioned Cleal patent, and to which the tax registering attachment is attached.

As stated above, the tax registering attachment herein described is shown applied to a machine of the Carney and Cleal type, and therefore, but a brief description of this machine will be given herein. This mechanism comprises, a series of amount keys 40 (Figs. 1, 4 and 5), pivoted on a rod 41, mounted in parallel side frames 42, only one of which is shown. Common to all of the keys 40 is a key coupler 43, the left hand end of which carries a stud 44, projecting into the frame 42, thus forming a pivot whereby the key coupler may be oscillated. The right hand end of the key coupler is provided with a similar stud (not shown) which projects in the right hand frame (not shown). Each of the keys 40 is provided with a notch 45 adapted to cooperate with a lip 46 formed on the rear edge of the key coupler 43 when any key is depressed at its outer end. Suitably mounted in the frames 42 is a transverse rotation shaft 47 adapted to be given a complete rotation upon each oscillation of the key coupler 43 by a mechanism shown in Fig. 4. By referring to said figure, it will be noted that at its right hand end the key coupler 43 is provided with a stud 48 which projects into an elongated slot 49 formed in a vertically reciprocable double rack 50. At its lower end, the double rack is provided with an open slot 51 which straddles a stud 52 mounted on the right hand side frame (not shown). At its upper end the rack is also slotted and on the inside walls of the slot the rack is provided with oppositely faced rack teeth 53 which cooperate with a pinion 54 fast on the rotation shaft 47. This mechanism is of substantially the same construction and operation as the mechanism shown in the aforesaid Carney and Cleal patents and for the accomplishment of the same purpose, that is, of giving a complete rotation to the shaft 47 at each oscillation of the key coupler, 43, the rotation being in the direction of the arrow (Fig. 4). In order to prevent a retrograde movement of the shaft 47 a ratchet or full stroke disk 55 is fast to the right hand end of the shaft 47 and cooperates with a spring pressed full stroke pawl or lever 56 loose on a stud 57 carried by the side frame 42.

It will thus be seen that upon each complete depression of the keys 40, the key coupler 43 is oscillated, and through connections shown in Fig. 4 and just described, a single rotation is given to the shaft 47. The function of the key coupler 43, as is well known in the art, is to permit the starting of an operation of two or more keys, for example, the "$9" and the "30¢" key and then complete the operation by pressing either one of the two keys. By reason of the engagement of the lip 46 of the key coupler 43 with the notches 45 in the keys, the "$9" and the "30¢" key will be fully operated by the complete depression of either one of the two keys.

Indicating mechanism.

Slidably mounted in the frame plates 60 and 61 (Fig. 5) just above the rear end of each of the keys 40, is an indicator bar 62 which carries at its top one of a series of indicating tablets 63 of a type fully shown and described in the hereinbefore mentioned Carney and Cleal patents. The indicator bars 62 are yieldingly held in their lowermost positions by springs 64 so that the lower ends of said bars are in contact with the rear ends of the keys 40. Each of the indicator tablets 63 bears a special character or characters which are preferably identical with the characters appearing on the forward ends of their appropriate keys 40.

When any of the keys 40 are depressed, the indicator bars 62 will be elevated against the tension of the springs 64 carrying the tablets 63 upward until a projection 65 on the bar 62 passes above a rocking bail 66 pivoted at 67 to the frames 42. The construction and operation of the bail 66 are old and well known in the art and will not be described in detail here. It is sufficient to state that the purpose of the bail 66 is to hold the indicator bars 62 appropriate to the depressed keys in the elevated positions between operations of the machine so as to sustain an indication between said operations, thereby showing which key or keys were depressed in the previous operation. It will thus be seen that when any one of the keys 40 is depressed, the proper indicator tablet 63 is raised and publicly exposed through sight openings in the cabinet, which are commonly provided in cash registers, so as to indicate which key or keys have been operated.

Totalizer.

The totalizer for accumulating thereon the amounts as registered by the keys 40, is substantially the same as that illustrated and described in the above mentioned Cleal patent. Reference to this patent may be had for a detailed description of said totalizer.

Described in brief terms, the totalizer comprises totalizer elements 70 (Fig. 5) each having secured to the side thereof a ratchet 71 and a pinion 72. The totalizer elements are loose on a shaft 73 carried by a framework 74 pivotally mounted upon brackets carried by a tie bar 75 which connects the side frames 42. Loose on a rod 76 mounted in the side frames is an actuating frame 77 having secured thereto a segment 78 arranged to be engaged by the totalizer pinion 72 at the proper time and in a manner to be hereinafter described. Cooperating with a rod 79 in the rear portion of the frame 77 are bars 80, the lower ends of which are pivotally mounted on the keys 40. Secured to the right hand end of the totalizer frame 74 is a lever 81 formed with two arms at its right hand end, each of said arms carrying an anti-friction roller 82. The two rollers 82 cooperate with a cam 83 fast on the rotation shaft 47. The lever is mounted on a pivot stud 84 carried by the totalizer frame as usual but is prevented from pivoting with respect to the frame by means of a pin 86 which projects from the totalizer frame and contacts with the forward end 85 of said lever. Upon a rotation of the shaft 47 by the depression of the key 40, as previously described, the cam 83 acts upon the lever 81 and rocks the totalizer frame 74 about its pivot 87 in a clockwise direction, whereby the pinion 72 is carried into engagement with the segment 78.

The depression of the key raises the bar 80 into engagement with the rod 79 carried by the actuating frame 77, thereby rocking said frame and consequently the segment 78 counter-clockwise thus rotating the pinion 72 a distance commensurate with the value of the key which has been depressed.

The transferring from a lower order to a higher order element of the totalizer is accomplished by means of a projection 88 integral with a disk 89 secured to the side of the totalizer element 70. This projection 88 is so positioned that as the wheel passes from "9" to "0" it engages a pawl 90 and rocks said pawl counterclockwise, thereby allowing another pawl 91, which is normally held in the position shown in Fig. 5 by the pawl 90, to be rocked in a clockwise direction through the actuation of a spring 92, pressing against the forward end of the pawl 91. The pawl 91 is pivotally mounted upon a lever 93 which in turn is pivotally mounted on the frame 74 at a point which coincides with the pivotal point 87 of the frame itself. The lever 93 carries an anti-friction roller 94 which cooperates with a cam 95 fast on the rotation shaft 47. At the proper time the cam 95 engages a latch plate 96, rocking said plate in a clockwise direction thereby releasing the lever 93 so that as the cam 95 continues in its rotation it will engage the roller 94 and rock the lever 93 in a clockwise direction, whereby the pawl 91 engages the ratchet 71 of the next higher order totalizer element and advances said element one step.

Meshing with each of the segments 78 is a pinion 97 secured to the end of one of a set of nested sleeves 98 on a shaft 99 which are for the purpose of transmitting the movement, commensurate with the value of the keys depressed, to the usual printing mechanism in machines of the above mentioned Carney and Cleal types.

Tax registering mechanism.

Figure 1A:
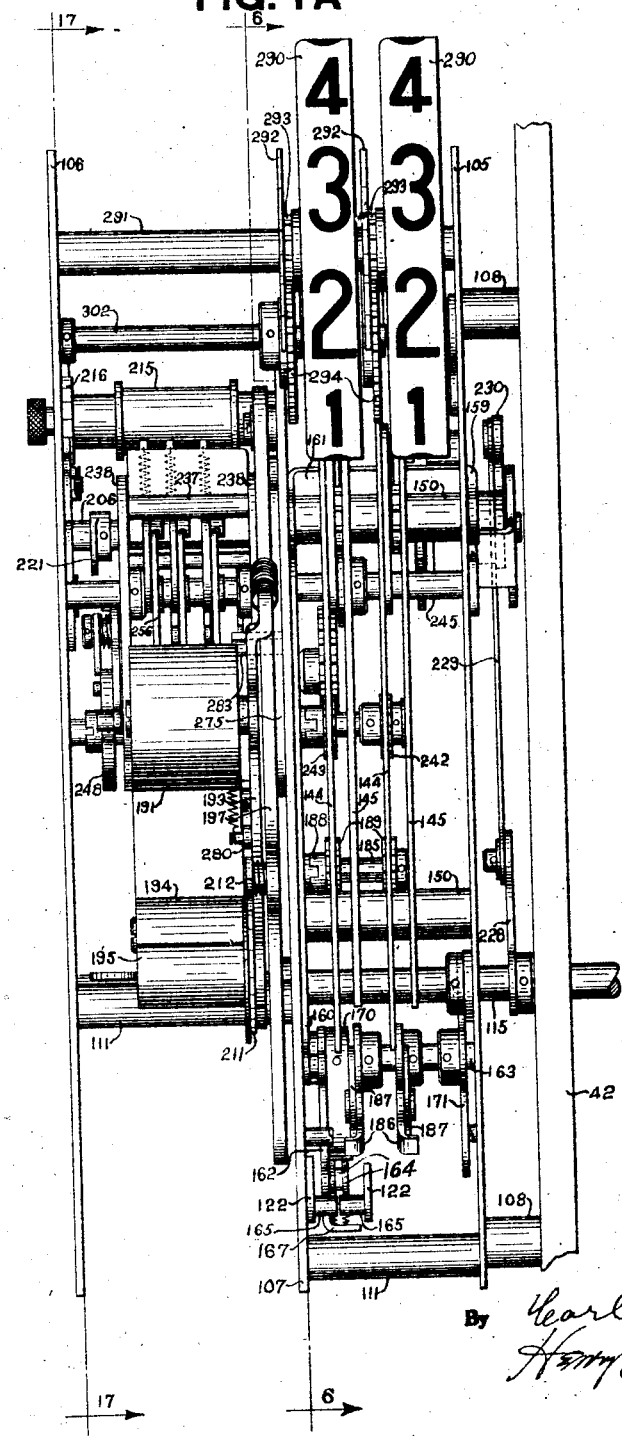
Fig. 1A is an enlarged plan view of a part of the mechanism shown in Fig. 1.
Figure 12:
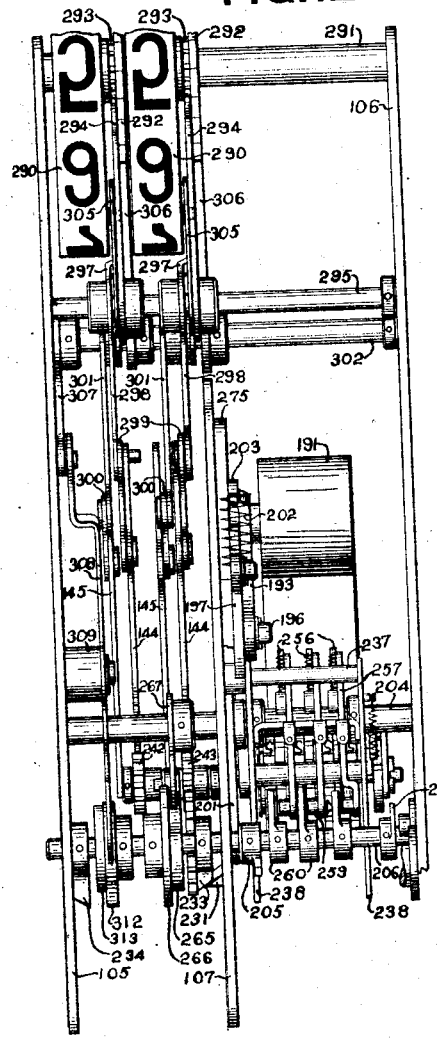
Fig. 12 is a rear elevation of the tax registering attachment, having some parts broken away.

The tax registering mechanism is carried between parallel plates 105 and 106 and an intermediate plate 107 (Figs. 1, 6 and 12). The plate 105 is mounted on three studs 108 (Fig. 6) carried by the frame 42. The plates 106 and 107 are held in their respective lateral positions at their upper ends by means of studs 109 and spacing sleeves 110 and at their lower ends by shouldered studs 111.

The means for driving the tax registering mechanism comprises an arm 112 (Figs. 1, 5 and 6) secured to the stud 44 which, it will be remembered, is carried by the key coupler 43 and receives an oscillation upon the depression of any of the keys 40. The arm 112 is bifurcated to receive a pin 113 carried by an arm 114 fast on a shaft 115 mounted in the plates 105 and 106. Rocking of the key coupler 43 through the arms 112 and 114 causes the shaft 115 to be rocked first counter-clockwise (Fig. 6) and then clockwise to normal position. The rocking of this shaft 115 through means to be hereinafter described, imparts motion whereby the various devices in the tax registering mechanism are operated to perform their respective functions.

Keyboard.

The keyboard for controlling the differential movements of the tax registering mechanism comprises two series of depressible keys 118 (Figs. 2, 3 and 10) mounted in frames 119 carried on rods 120 mounted in the plates 105 and 107. Each of the keys 118 carries a pin 121 which cooperates with a sliding plate 122 having slots 123 into which project shouldered studs 124 carried by the frames 119. The plates 122 are held in their normal position by coil springs 127 stretched between the lower ends of the plates and a rod carried by the plates 105 and 107. The frames 119 are provided with openings 125 to make room for springs 126, one of which surrounds each of the keys 118 and holds the key in its normal position so that the pins 121 lie against the upper edge of the openings 125. Each key 118 is provided with a notch 130 which cooperates with a beveled projection 131 formed on a detent 132 having slots 133 whereby the detents are slidably mounted on the bottoms of the frames 119 by screws 134. The detents 132 are held in their normal position (Fig. 6) by coil springs 135 stretched between a projection 136 on the detent 132 and a stud carried by the plate 107.

Means is provided for preventing the depression of more than one key in a series at a time. This means comprises a series of disks 139 (Figs. 3 and 6) which lie in recesses 140 cut in the frame 119. The disks 139 are prevented from falling out of said recesses by the sliding plate 122 which lies adjacent thereto. The disks 139 are so arranged that there is room enough for only one of the pins 121 to pass between any two of said disks. The depression of any key causing its pin 121 to move the disks on both sides thereof in the opposite directions thereby preventing any of the remaining keys from being depressed.

Depression of any key causes its pin 121 through its engagement with the plate 122 to move said plate forward (Fig. 6) against the tension of its spring 127. Depression of the key also causes the detent 132 to be moved rearward and as the notch 130 in the key comes opposite the detent the spring 135 restores the detent to normal position thus locking the key in depressed position.

Actuating mechanism.

Each of the keys 118 is provided at its lower end with a projection 141, which cooperates with shoulders 142 and 143 on a pair of slidable plates 144 and 145 respectively. Each plate has slots 146 and 147 through which a shaft 148 and a rod 149 extend. The rod 149 is mounted rigidly in the plates 105 and 107, but the shaft 148 projects through slots in the frames 105 and 107, which coincide with the slots 146. The plates 144 and 145 are held in position laterally by collars 150 (Figs. 1, 1ᴬ and 6).

Secured to the side of the plate 144 is a rack 155 meshing with a gear 156 loose on the shaft 148. Secured to the side of the gear 156 is a pinion 157 meshing with a rack 158 fast to the plate 145. Loose on one end of the shaft 148 is an arm 159 and loose on the other end of the shaft 148 is one end of a link 160, said arm and said link being integrally connected by a yoke 161. The forward end of the link 160 is pivoted to the vertical arm of a bell crank 162 loose on a shaft 163 mounted in the plates 105 and 107. The horizontal arm of the bell crank 162 has pivotally mounted thereon two levers 164, one of which is shown in Fig. 6 while both are shown in Figs. 1 and 1ᴬ but designated only in the latter figure. The upper ends of the levers 164 are held in engagement with studs 165, one of which is mounted in each of the plates 122, by springs 166 compressed between said levers 164 and a formed projection 167 of the bell crank 162. The levers 164 are provided with projections 168 which cooperate with a notch 169 in an arm 170 fast on the shaft 163. Also fast on the shaft 163 is an arm 171 provided with a cam slot 172 into which projects a roller 173 carried by an arm 174 fast on the rock shaft 115.

From the above description it can be seen that upon depression of a key 118, say in each bank, that the studs 165 are moved forward whereby the levers 164 under the influence of the springs 166 rock clockwise and their projections 168 engage the notch 169 in the arm 170. However, if a key 118 in only one bank is depressed the lever 164 cooperating with the other bank will remain in the position shown in Fig. 6 due to the fact that the plate 122 is not moved and consequently the lever 164 cannot be moved by its spring 166. After the engagement of the portion 168 with the notch 169, and upon depression of any of the keys 40 whereby the shaft 115 is rocked first counter-clockwise and then clockwise, as previously described, upon the counter-clockwise movement of said shaft the arm 174 is rocked counter-clockwise and through the roller 173 and slot 172, the arm 171, shaft 163 and arm 170 are rocked in a clockwise direction (Fig. 6). The projection 168 being in engagement with the notch 169, consequently, when the arm 171 is rocked clockwise, as just described, the bell crank 162 is rocked clockwise thereby moving the link 160 to the right and through the yoke 161 and arm 159 sliding the shaft 148 towards the front of the machine. When the shaft is slid towards the front of the machine the plates 144 and 145 are slid forward until one of the shoulders 142 or 143 engages the projection 141 on the depressed key. When this occurs the plate carrying such shoulder will be arrested and the pinion 157 and gear 156 will rotate until a shoulder on the other plate engages the projection 141 of the depressed key. For example, let it be assumed that the "8" key 118 has been depressed. This is the next to the top key in Fig. 6.

With this key depressed when the plates 144 and 145 are slid forward the second shoulder 143 in the plate 145 will be the first to engage the projection 141 on the depressed key. When this occurs, the plate 145 and the rack 158 will stop. The stopping of the rack 158 and the continued forward movement of the link 160 causes the pinion 157 to roll over the rack 158 in a clockwise direction. The gear 156 being fast to the pinion 157 consequently rotates in the same direction, and thereby through the rack 155 moves the plate 144 forward until its first shoulder 142 from the left strikes the portion 141 of the depressed key. These racks are called complementary racks, one rack moving in this case one space, and the other eight spaces or the complement with respect to nine.

When a key 118 in only one of the two banks is depressed, it is desired that the plate 144 cooperating with the other bank should not move forward upon movement of the link 160. Means for accomplishing this purpose comprises a stud 178 carried by each of the plates 144 and normally in engagement with one end of a bell crank 179 loose on the rod 109. The upper end of the bell crank 179 carries a pin 180 projecting into a slot 181 formed in the plate 122. The bell crank 179 is held in normal position by a coil spring 182 stretched between the upper end of said bell crank and a stud carried by the frame 105. From this it can be seen that when there is no key depressed and consequently the plate 122 is not moved downward thereby, the lower end of the bell crank 179 being in engagement with the stud 178 will prevent movement of the plate 144, and the plate 145 will move the full nine steps. However, when a key is depressed the movement of the plate 122 through the slot and pin connection rocks the bell crank 179 clockwise out of the path of stud 178 carried by the plate 144 thus allowing the two plates to be moved by the link 160.

By means to be hereinafter described, the plates 144 and 145 set up a detail printing mechanism and control a totalizer. After the printing mechanism and the totalizer have been operated by the plates 144 and 145 said plates are returned to their normal positions and the depressed key is released. The plates 144 and 145 are returned to their normal position by the counter-clockwise movement of the shaft 163 to its normal position, which moves the link 160 to the left to normal position. Near the end of the counter-clockwise movement of the shaft 163 a device is operated for releasing the depressed key. This device comprises two arms 186 fast on the shaft 163 and each having pivotally mounted thereon a spring pressed pawl 187 which is in alignment with the projection 136 on the detent 132. When the arm 186 is rocked clockwise the pawl 187 being resiliently mounted engages the projection 136 and the pawl rocks slightly counter-clockwise so that it may pass beneath said projection. However, upon the counter-clockwise movement of the arm 186 to normal position the pawl 187 engages the forward edge of the projection 136 and moves the detent 132 upward thereby releasing the projection 131 from the notch 130 in the depressed key after which, and as the pawl 187 passes out of engagement with the projection 136, the spring 135 returns the detent 132 to normal position. When the key is released it allows the spring 127 to move the plate 122 back to normal position whereupon the pin 165 will be engaged by the beveled edge of the upper end of the lever 164 as the bell crank 162 nears the end of its counter clockwise movement and said lever rocked counter-clockwise thereby disengaging its projection 168 from the notch 169 in the arm 170. Thus the driving connection is broken between the plates 144 and 145 and the rock shaft 115 and remains broken until one of the keys 118 is depressed for a subsequent operation of the machine. When the plate 122 is moved to normal position the spring 182 rocks the bell crank 179 counter-clockwise to normal position thus locking the plate 144 in the normal position.

*Printing and totalizing mechanism.*

As previously stated the tax registering mechanism is provided with a detail printer, or in other words, a printing mechanism which prints the amount of the tax for each operation of the machine as controlled by the keys 118. This printing mechanism comprises two type wheels 184 (Fig. 17) one of which is fast on a shaft 185 the other being fast upon a sleeve 188 loose upon said shaft. Secured to the other end of the shaft 185 and sleeve 188 are two pinions 189 (Figs. 1, 1ᴬ and 6) each meshing with a rack 190 (Fig. 6), formed on the underside of each of the plates 144.

From this it can be seen that when the racks 190 are set commensurate with the values of the keys depressed their movements are transmitted to the type wheels 184 so that the amount may be printed upon a detail strip to be later described.

The detail strip is fed from a supply roll 191 (Fig. 17) mounted on a stud 192 carried by a plate 193 and passed underneath a resilient platen 194 and wound upon a receiving roll 195. The platen 194 and the receiving roll 195 are both mounted upon the plate 193. The plate 193 is pivoted on a stud 196 carried by a plate 197 mounted to slide on studs 198 carried by the plate 107. The plate 197 is held in the normal position by a spring 199 stretched between said plate and the rod 120 and is only moved for a special purpose to be hereinafter described. The plate 193 carries a stud 200 held in engagement with the horizontal arm of a bell crank 201 (Figs. 17, 18 and 20) by a spring 202 compressed between the plate 197 and a portion 203 of the plate 193. The bell crank 201 is loose on a shaft 204 mounted in the plates 105 and 106. The vertical arm of the bell crank 201 has a lug 207 with a flat side 208. The lug 207 is normally in engagement with a disk 205 fast on a rock shaft 206. Said disk has formed thereon a cam portion 209 adapted to cooperate with the lug 207. The shaft 206 is adapted to be rocked first counter-clockwise (Figs. 6, 17 and 18) then shifted to the right (Fig. 12) or to the left, as viewed in Figs. 14 and 20, then rocked clockwise to normal position and finally shifted back to normal position by means which will be hereinafter described. During the counter-clockwise movement of the shaft 206, the portion 209 of the disk 205 engages the lug 207 and rocks the bell crank 201 counter-clockwise and through its engagement with the stud 200 rocks the plate 193 counter-clockwise and raises the platen 194 further away from the type wheels 184 and compresses the spring 202. When the high point of the cam 209 passes beyond the flat portion 208 of the lug 207, the spring 202 having been put under extra compression forces the platen 194 with a hammer like blow against the type wheels 184 whereby an impression is made upon a detail strip, such as illustrated in all but the last line of printing in Fig. 13.

The disk 205 is provided with a clearance cut 210 to allow the platen 194 to engage the type wheels 184.

This impression must take place before the plate 144 is returned to its normal position as the rack 190 thereon is always in engagement with the pinions 189 which set the type wheels 184. After the lug 207 on the bell crank 201 is dropped off the high portion of the cam 209 the shaft 206 and the disk 205 are shifted by means to be later described. However, said disk is wide enough so that the lug 207 will not be entirely disengaged therefrom. After being shifted the shaft 206 is rocked clockwise whereby the lug 207 is moved to the true periphery of the disk 205 by its engagement with the edge 223 of the cut 210. Near the end of the clockwise movement of the shaft 206 it is shifted back to normal position so that the lug 207 will be in line with the cam portion 209. If the cam were not shifted sidewise it is very obvious that it could not be rocked backwards to normal position as it would lock itself against the lug 207.

Figure 13:
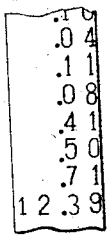
Fig. 13 shows a fragmentary portion of the detail strip printed by the tax registering attachment.

After each print upon the detail strip it is necessary to feed it so that the printing for the next operation will be properly spaced from the previous one. This is accomplished by a ratchet 211 secured to the receiving roll 195. Engaging the ratchet is a spring pressed pawl 212 pivoted on the plate 197. As the plate 197 does not rock and the plate 193 is rocked counterclockwise, it can be seen that upon movement of the plate the ratchet wheel 211 will be advanced one step by the pawl 212 which remains practically stationary while the plate 193 is being moved backward. This distance is sufficient to space the printing on the detail strip, as shown in Fig. 13.

Means for inking the type wheels 184 comprises an endless ribbon 213 carried by three rollers 214 mounted on the frame 107 and a felt roll 215 having secured to the side thereof a ratchet 216 engaged by a pawl 217 mounted to the slide on the shaft 206 and a pin 218 carried by the plate 106. The pawl is held in the normal position shown in Fig. 17 by a spring 219. Said pawl carries a pin 220 which cooperates with a cam 221 fast on the shaft 206. From this description it can be seen that when the shaft 206 is rocked counter-clockwise (Fig. 17) the cam 221 through its engagement with the pin 220 slides the pawl 217 to the left thereby turning the ratchet and consequently the felt roll 215 whereby the ribbon is caused to move so that the type will not strike in the same place during two consecutive operations of the machine. When the shaft 206 is rotated clockwise to normal position the spring 219 causes the pin 220 to follow the periphery of the cam 221 and consequently draws the pawl 217 backward to normal position. To prevent retrograde movement of the roll 215 and ratchet 216 when the pawl 217 is being returned to normal position a spring pressed retaining pawl 222 carried by the plate 107 engages the ratchet 216.

*Mechanism for rocking and shifting the shaft 206.*

The means for rocking the shaft 206 first counter-clockwise and then clockwise comprises an arm 228 (Figs. 1, 1^A and 6) fast on the rock shaft 115. Pivoted to the arm 228 is one end of a link 229, the other end of which is pivoted to an arm 230 secured to the shaft 206 by a key 227 (Fig. 8). This key permits the arm 230 to rock the shaft 206 and also permits said shaft to be shifted endwise. When the shaft 115 is rocked counter-clockwise and then clockwise to normal position, as previously described, the arms 228 and 230 and the link 229 cause the shaft 206 to be rocked first counter-clockwise and then clockwise as previously stated.

Figure 14:
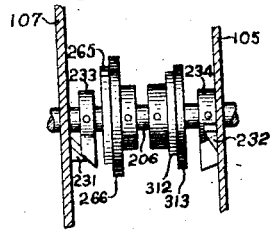
Fig. 14 is a detail view, looking from the front and partly broken away, showing the means for shifting the cam shaft, some of the parts on the shaft being removed.
Figures 19, 20:
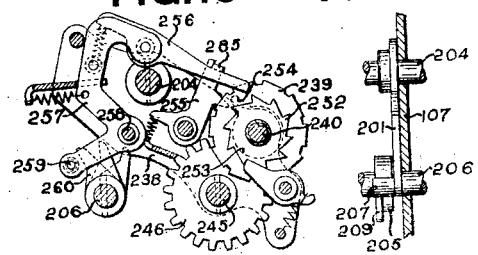
Fig. 19 is a detail view, partly in section of the totalizer and its transfer mechanism.
Fig. 20 is an end view of the mechanism shown in Fig. 18 and shows a portion of one of the side plates.

The means for shifting the shaft 206 to the right (Fig. 12) or to the left as viewed in Figs. 14 and 20, and then back again comprises lugs 231 and 232 (Fig. 6) carried by the plates 107 and 105 respectively. Cooperating with these lugs are two arms 233 and 234 fast on the shaft 206. Near the end of the counter-clockwise movement of the shaft 206 (Fig. 6) the beveled edge of the arm 234 engages the beveled edge of the lug 232 (Fig. 14) and as the shaft finishes its movement the arm 234 through its engagement with the lug 232 is shifted to the left (Fig. 14) or to the right as viewed in Fig. 12, thereby shifting the shaft 206 and the arm 233 thereon until said arm 233 lies adjacent the plate 107. It will be noticed in Fig. 6 that the arm 233 is in contact with the lug 231. However, this arm is rocked counter-clockwise with the shaft, it being fast thereto, so that when the shaft is shifted and this arm lies adjacent the plate 107 it is not in engagement with the lug 231. However, upon the clockwise movement of the shaft 206 to normal position the arm 233 is in the plane of the lug 231 and as the shaft completes its oscillation in a clockwise direction the beveled edge of the arm 233 engages the beveled edge of the lugs 231 and cams said arm, the shaft 206 and the arm 234 back to normal position shown in Fig. 14. There are four reasons for shifting of the shaft 206, the first reason having already been stated in connection with the bell crank 201 and the disk 205; the other three reasons will be hereinafter described in connection with the totalizer mechanism, transfer mechanism and the indicating mechanism. During the shifting of the shaft 206 the arm 230 is held in its lateral position by a formed plate 235 (Figs. 8 and 9) and a hub 236 fast to said arm. It might be stated here that the slot 172 (Fig. 6) in the arm 171 is provided with two neutral portions at the extreme ends of said slot to take care of the time which it takes to shift the shaft 206, as just described.

*Tax totalizer.*

Figure 15:
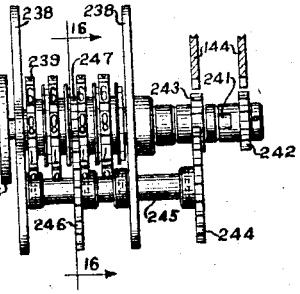
Fig. 15 is a detail view of the totalizer and a portion of its actuating mechanism, the operating racks therefor being shown in section and partly broken away.

This totalizer is mounted between parallel frames 238 (Figs. 15 and 17) mounted fast on the shaft 204. The frames are properly spaced by rods 237 (Fig. 12). There are four totalizer wheels 239 loose on a shaft 240 mounted in the frames 238. The wheel to the right (Fig. 15) or the "units" wheel is connected by a tube 241 through a mortise and tenon connection to a pinion 242 loose on the shaft 240. The pinion 242 is in alignment with the plate 144 associated with the units bank of keys 118. The plate 144 associated with the tens bank of keys is in alignment with a pinion 243 loose on the sleeve 241. The pinion 243 meshes with a gear 244 fast on a shaft 245 carried by the frames 238. Also fast on the shaft 245 is a gear 246 meshing with a gear 247 (Figs. 15 and 16) secured to the side of the tens totalizer wheel 239. By means to be hereinafter described the totalizer frame 238 is rocked counter-clockwise whereby the pinions 242 and 243 engage the racks 190 integral with the plates 144 controlled by the units and tens bank of keys 118. These pinions are rocked into mesh with the racks 190 near the beginning of the operation of the machine before the plates 144 are moved differentially under the control of the keys. After said plates have been moved and before they are returned to their normal position the totalizer frames 238 are rocked clockwise to normal position thereby disengaging the pinions 242 and 243 from the racks 190.

Figure 17:
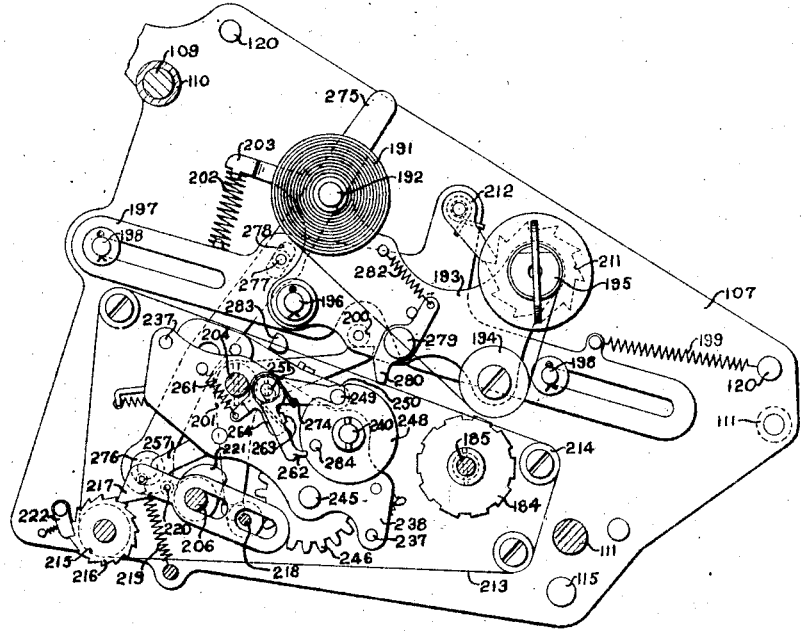
Fig. 17 is a vertical section on the line 17—17 of Fig. 1, looking in the direction of the arrows.
Figure 18:
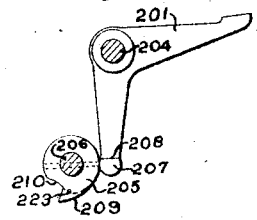
Fig. 18 is a detail view of the cam and arm for operating the detail printer.

The reason for using the gears 244 and 246 to step across the units wheel and into the tens wheel is because in totalizers of this type which are well known in the art, the wheels 239 must be mounted upon a shaft in order that they may be turned to zero by a notch in the shaft which engages pawls (not shown) carried by each of the totalizer elements upon rotation of a disk 248 fast to the shaft 240. The disk 248 is provided with a hub having turn-to-zero key receiving notches as shown in Fig. 17. Said disk also has a recess in its periphery in which normally lies a stud 249 (Fig. 17) carried by a lever 250 mounted on a stud 251 carried by the frame 238. The stud 249 is held in engagement with the disk 248 by a spring 261. Slidably and pivotally mounted upon the stud 251 is a pawl 262 having a flange 263 held in engagement with an arm 264 integral with the lever 250 by a torsion spring 274. When the disk 248 is rotated clockwise (Fig. 17) the lever 250 is rocked counter-clockwise as the stud 249 is cammed to the outer periphery of the disk 248. When this happens the pawl 262 is rocked so that it lies in the path of movement of a pin 284 carried by the disk 248. Practically at the end of the rotation of the disk 248 the pin 284 engages the pawl 262 and slides the pawl until it is stopped by the stud 251 engaging the outer end of its slot. Shortly after the pin 284 engages the pawl 262 the stud 249 drops off from the true periphery of the disk 248 and when the operator releases the pressure on his turn-to-zero key the spring 261 rocks the lever 250 so that its stud engages the notch as shown in Fig. 17. The pawl 262 under the influence of the spring 274 will then return to normal position. The stopping of the disk 248 by the pawl 262 is just a trifle past the zero position. This is to insure that the stud 249 will be rocked off from the true periphery of the disk 248 and caused to engage in the notch.

*Transfer mechanism.*

The means for transferring from the units to the tens wheel, the tens wheel to the hundreds, and from the hundreds to the thousands wheel is substantially the same as that previously described in connection with the regular totalizer in the machine, and therefore, but a brief description of it will be given herein, it being sufficient to state that each of the totalizer elements 239 has secured to the side thereof a ratchet 252 and also a disk 253 having integral therewith a projection 254 which cooperates with a pawl 255 of the next higher order element. The pawl 255 holds a pawl 256 in the position shown in Fig. 19. The pawl 256 is mounted on a lever 257 mounted on a rod 258 carried by the frames 238. The lever 257 is provided with a roller 259 which cooperates with a cam 260 fast on the shaft 206. When a wheel 239 passes from "9" to "0" the projection 254 engages the pawl 255 and rocks said pawl counter-clockwise thereby disengaging it from a portion 285 of the pawl 256 and allowing said pawl to rock clockwise into engagement with the ratchet 252. With the pawl in this position when the cam 260 engages the roller 259, as said cam is being rotated clockwise to normal position, it rocks the lever 257 clockwise thereby moving the pawl 256 forward to advance the ratchet and its totalizer element 239 one step. It might be well to state here that when the shaft 206 is rocked counter-clockwise the cams 260 are not in alignment with the rollers 259 carried by the levers 257 but after the shaft 206 has been shifted as previously described, the cams 260 are in alignment with the rollers 259 during the return movement of the shaft 206 in a clockwise direction to its normal position. Near the end of its clockwise movement the shaft is shifted back to normal in order to allow the cams 260 to pass the rollers 259 when the shaft is being rocked in a counter-clockwise direction during the next operation of the machine. This is the second reason for shifting this shaft at each operation of the machine. The levers 257 are all rocked but if the pawls 255 have not been tripped the pawls 256 pass over the top of the ratchets and do not advance them as when transferring.

*Totalizer rocking means.*

Figure 21:
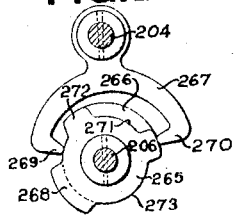
Fig. 21 is a detail view of the cam and arm for engaging the totalizer with the actuators.

The means for rocking the frame 238 to engage the pinions 242 and 243 with the racks 190 comprises a cam 265 (Figs. 6, 12 and 21) fast on the shaft 206. Secured to the side of the cam 265 is another cam 266. Cooperating with the cams is a Y-shaped arm 267 fast on the shaft 204 to which, it will be remembered, are also fast the frames 238. When the shaft 206 is rocked counter-clockwise a high portion 268 on the cam 265 engages a portion 269 of the arm 267 and rocks said arm counter-clockwise whereby a portion 270 of the arm 267 engages the low portion 271 of the cam 265. The contour of this cam 265 is such that the gears 242 and 243 are rocked into engagement with the racks 190 near the beginning of the operation of the machine and held in engagement therewith until said racks are differentially positioned under control of the keys 118. After the racks have been so positioned the portion 272 of the cam 265 engages the portion 270 of the arm 267 and rocks said arm clockwise to normal position thereby disengaging the gears 242 and 243 from the racks 190. When the portion 270 is engaged by the portion 272 the portion 269 is rocked off from the portion 268 and engages a portion 273 of the cam 265. This is near the completion of the counter-clockwise movement of the shaft 206. After the arm 267 has been rocked back to the position as just described, the shaft 206 is shifted to the right (Fig. 12) thereby moving the cam 265 out of engagement with the arm 267 entirely, and causing the cam 266 to be moved into engagement with said arm 267. The contour of the cam 266 is such that the arm 267 is held in the position shown in Fig. 6 during the time that the shaft 206 is rocked clockwise to its normal position. Near the end of the clockwise movement of the shaft to normal position said shaft is again shifted to the left (Fig. 12) as previously described, whereby the cam 266 is disengaged from the arm 267 and the cam 265 is moved into engagement therewith. It is very obvious that if the shaft 206 were not shifted when it is rocked clockwise to normal position, the pinions 242 and 243 would again be engaged with the racks 190 and would be moved to the position which they occupied before having anything accumulated therein, and consequently it is necessary to shift the shaft 206 to hold the arm 267 in the position shown in Fig. 6 thus holding the pinions 242 and 243 out of engagement with the racks 190 after an amount has been accumulated into the totalizer elements. This is the third reason why it is necessary to shift the shaft 206 back and forth during its oscillation.

*Total printing.*

As previously stated the tax registering mechanism is adapted to print a total from the totalizer elements whenever desired. This is accomplished by type which is arranged on the periphery of each of the totalizer elements 239. Means for taking an impression from this type comprises a manually operated lever 275 pivotally mounted on the plate 107 at a point 276. Said lever is provided with a pin 277 which projects into a slot 278 formed in the previously described plate 197. When it is desired to print a total from the type on the periphery of the totalizer elements 239 the lever 275 is moved counter-clockwise (Fig. 17) whereupon the plate 197 is slid to the left and carries with it the plate 193, the detail strip and the platen 194. Pivotally mounted on the plate 193 at 279 is a lever 280 held in engagement with a pin 281 by a spring 282 stretched between the upper end of the lever 280 and a pin carried by the plate 193. When the plate 197 and the plate 193 are moved to the left by the lever 275 the lower end of the lever 280 engages a lug 283 carried by the plate 107, and as said lever 280 cannot be rocked counter-clockwise any further than shown in Fig. 17, the plate 193 will be rocked counter-clockwise by the engagement of the lug 283 with the lower end of the lever 280. After said lever passes over the lug the platen 194 is in a position directly above the totalizer elements 239 and through the force of the compression spring 202 is forced with a hammer like blow against said totalizer wheels thereby causing the amount which has been accumulated on the totalizer elements to be printed upon the detail strip. The lever 275 is then moved clockwise to normal position whereupon the lever 280 again engages the lug 283 but this time the engagement being on the opposite side of the lug the lever is merely rocked clockwise until it passes over said lug whereupon it regains its normal position under the influence of the spring 282.

*Indicating mechanism.*

As before stated, the tax registering mechanism is provided with an indicating mechanism to indicate the amount of the tax, or in other words, to indicate which of the keys 118 have been depressed. This mechanism comprises two indicator drums 290, (Figs. 1, 6 and 12) one for the units and one for the tens bank of keys 118. The drums have indicia on their peripheries which correspond to the characters on the keys 118. The drums are loose on a shaft 291 carried by the frames 105 and 106. Secured to the side of each of the drums 290 is an aligner disk 292 and a pinion 293. The pinion 293 meshes with a segment 294 loose on a shaft 295 carried by the frames 105 and 106. The segment 294 carries a pin 296 adapted to be engaged by an arm 297 loose on the shaft 295. Integral with the arm 297 is an arm 298 having pivoted thereto one end of a link 299 the other end of which is pivotally connected to the plate 144. Pivotally connected to the plate 145 is one end of a link 300, the other end of which is pivoted to an arm 301 loose on a shaft 302 carried by the frames 105 and 106. Loose on the shaft 302 and secured to the arm 301 is a segment 303 meshing with a segment 304 loose on the shaft 295, and having integral therewith an arm 305 which cooperates with the pin 296. From the above description it can be seen that movement of the plates 144 and 145 through the links 299 and 300 and, arm 298, and arm 301 and segments 303 and 304, will cause the arms 297 and 305 to come together in scissors like fashion and engage the stud 296 and move the segment 294 to position the indicator drum 290 to indicate commensurate with the value of the key depressed.

The means for aligning the indicator drums in the proper position and retaining them in this position until a subsequent operation of the machine, comprises the aligning disks 292 which are normally engaged by aligners 306 fast on the shaft 302. Also fast on the shaft 302 is an arm 307 connected by a pin and slot connection to a lever 308 mounted on a stud 309 carried by the plate 105. The lower end of the lever 308 is Y-shaped and provided with two projections 310 and 311 (Fig. 7) which cooperate with a cam 312 and a cam 313 secured to the side thereof. These cams are fast on the rock shaft 206. When the shaft 206 is rocked counter-clockwise the portion 314 of the cam 312 engages the projection 310 and causes the lever 308 to be rocked counter-clockwise thereby rocking the arm 307 and the aligners 306 in a clockwise direction and disengaging the aligners from the disks 292. When the portion 314 engages the portion 310 the portion 311 drops down to the portion 315 of the cam 312. Near the end of the counter-clockwise movement of the shaft 206 and after the portion 310 has dropped down to the portion 316 and after the portion 311 has been engaged by the portion 317 of the cam 312 the shaft 206 is shifted to the right (Fig. 12) thereby moving the cam 312 out of engagement with the lever 308 and moving the cam 313 into engagement with the lever 308. The cam 313 is so shaped that when the shaft 206 is rocked clockwise to normal position, the lever 308 is held in position shown in Figs. 6 and 7 so that the amount which has been set upon the indicator drums 290 will be retained thereon until a subsequent operation of the machine. The periphery of the cam 313 which engages the projection 311 is of the same radius as the portion 317 of the cam 312 thus preventing the lever 308 from being rocked back and forth when the shaft 306 is rocked clockwise to normal position. During this movement of the shaft 206 if it were not for the fact that said shaft is shifted, the lever 308 would be rocked back and forth and the indicator drums 290 would be allowed to get out of alignment thus destroying the indication which it is desired to maintain until a subsequnt operation of the machine. This is the fourth reason for shifting the shaft 206 back and forth during its oscillation.

Operation.

A brief description of the operation of the machine will be given, it being assumed that a taxable article has been sold for $3.00 and the tax on said article is 10 per cent or 30 cents. First the operator depresses the "3" key 118 in the tens bank (left hand bank Fig. 2) and then depresses the "$3" key 40. Depression of the "$3" key 40 rocks the key coupler 43 counter-clockwise (Fig. 5) whereby through the stud 48 the rack 50 is moved upward and causes the shaft 47 to be rotated counter-clockwise (Fig. 4). The rotation of the shaft engages the pinion 72 of the totalizer element with the segment 78 so that as the bar 80 is raised and engages the rod 79 the amount commensurate with the value of the key which has been depressed is accumulated on the totalizer element 70. Depression of the key also raises the indicator rod 62 and exposes the proper indicator target 63 to view. When the key 40 is released the key coupler 43 rocks clockwise to normal position under its own weight, completes the rotation of the shaft 47 and insures that the keys are returned to their normal positions.

Figure 16:
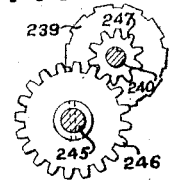
Fig. 16 is a section on the line 16—16 of Fig. 15, looking in the direction of the arrows.

Upward or clockwise movement (Fig. 6) of the key coupler 43 rocks the shaft 115 counter-clockwise and through the arm 171, shaft 163 and link 160 moves the plates 144 and 145 to the right until they are stopped by the end 141 of the depressed key 118. This movement of the plates 144 and 145 through the links 299 and 300, arm 298, arm 301 and segments 303 and 304, and arms 297 and 305 positions the indicator drums 290 to indicate 30¢. The movement of the plate 144 through the rack 190 sets the printing wheels 184. Oscillation of the shaft 206 through the arm 228, the link 229 and the arm 230 rocks the bell crank 201 and causes the platen 194 to be raised and the spring 202 compressed, which spring when released forces the platen against the type wheels 184 thereby printing on the detail strip the amount commensurate with the value of the keys which were depressed, in this case the 30¢ key. Movement of the shaft 206 also causes the totalizer frames 238 to be rocked whereby the pinions 242 and 243 engage the racks 190 on the plates 144, consequently the amount 30¢ is accumulated into the totalizer elements 239 (Figs. 16, 17 and 19). After the amount has been accumulated into the totalizer and set up on the indicating drums 290 and printed from the detail type wheels 184 the shaft 163 is rocked counter-clockwise to normal position through the arms 171 and 174. The arm 174 being moved clockwise to normal position by the downward or counter-clockwise movement of the key coupler 43 through its connection, by means of the arms 112 and 114, to the shaft 115. The movement of the plates 144 and 145 to normal position, however, does not move the indicator drums 190 to zero position, they being allowed to remain in the position to which they have been set due to the fact that said indicating drums are set by the complementary movement of the two racks through the scissors like motion of the arms 297 and 305 and are held in alignment by the aligners 306. Consequently when the plates 144 and 145 are returned to normal position the arms 297 and 305 open in a scissors like fashion and allow the segment 294 to remain in the position to which it has been set.

The amount of tax collected for any given period may be recorded on the tax detail strip by moving the lever 275 first counter clockwise and then clockwise. Counter clockwise movement operates to shift the platen roller 194 to a position above the totalizer type wheels, and, through the instrumentality of the lever 280 and lug 283, to raise the platen against the force of the spring 202 which operates to cause an impression to be made as the lever 280 drops behind the lug 283. Clockwise movement of the lever 275 merely shifts the parts back to normal, the lever 280 pivoting to slide over the lug 283 without raising the platen.

While the form of mechanism herein shown and described is admirably adapted to fulfill the objects primarily stated, it is not intended to confine the invention to the one form of embodiment for it is susceptible of embodiment in various forms all coming within the scope of the claims which follow.

What is claimed is:

1. In a machine of the class described, the combination of a plurality of series of depressible amount determining keys, a main operating device controlled by one series, a totalizer, actuators therefor controlled by another series, said last mentioned series being normally fully depressible, driving mechanism for the actuators operated by the main operating device and normally disconnected from said device, and means operated by a depression of a key in the second series for connecting the driving mechanism to the main operating device.

2. In a machine of the class described, the combination of a series of depressible keys constituting totalizer actuator stops, a main operating device, a totalizer, actuators therefor controlled by said keys, driving mechanism for the actuators operated by the main operating device and normally disconnected from said device, and a movably mounted member carried by said mechanism and actuated by depression of a key to operatively connect the driving mechanism to the main operating device.

3. In a machine of the class described, the combination of a series of depressible keys, a main operating device, a totalizer, actuators therefor controlled by said keys, means for locking the actuators in the normal position, driving mechanism for the actuators operated by the main operating device and normally disconnected from said device, means operated by the depression of a key for releasing said locking means, and pivoted coupling means operable upon depression of a key for connecting the driving mechanism to the main operating device.

4. In a machine of the class described, the combination of a series of depressible keys, a main operating device, a totalizer, actuators therefor controlled by said keys, means for locking the actuators in the normal position, driving mechanism for the actuators operated by the main operating device and normally disconnected from said device, and means operating independently of any movement of the actuators and operated by the depression of a key for releasing said locking means and for simultaneously connecting the main operating mechanism to the driving device.

5. In a machine of the class described, the combination of two series of manipulative devices, a totalizer, actuators therefor controlled by one of said series of manipulative devices, driving mechanism for the actuators involving a rockable member, a rockable member operated by any one of the devices in the other series for operating said driving mechanism, and means controlled by a device in said first series for coupling said rockable members.

6. In a machine of the class described, the combination of a series of depressible keys, a totalizer, actuators therefor controlled by said keys, normally ineffective driving mechanism for the actuators, an oscillating device for operating said driving mechanism, means operated by complete depression of a key for rendering the driving mechanism effective, and a series of manipulative devices for oscillating said oscillating device.

7. In a machine of the class described, the combination of a series of depressible keys, a totalizer, actuators therefor controlled by said keys, normally ineffective driving mechanism for the actuators, an oscillating device for operating said driving mechanism, means operated by depression of a key for connecting said oscillatory device to the driving mechanism, a rockable member operatively connected to said oscillating device, and a series of manipulative devices for operating said member to oscillate the oscillating device.

8. In a machine of the class described, the combination of two sets of manipulative amount determining devices, printing mechanisms involving printing elements controlled by said sets, separate impression means cooperating with said printing elements, and means under control of the one set and operable thereby independently of any operation of the other set for operating both of said impression means.

9. In a machine of the class described, the combination of a value register for recording values of sales, an attachment involving recording elements adjustable independently of said value register, and impression means mounted in said attachment cooperable with said recording elements and operable from said value register.

10. In a machine of the class described, the combination of two registering sections, separate sets of completely depressible manipulative amount determining means for each section, and means actuated by the depression of the set of amount determining means of one section for effecting a registration in the other section in accordance with the depression of the amount determining means of said other section.

11. In a machine of the class described, the combination of two independent sets of independently operable and completely depressible manipulative amount determining devices, recording elements adapted to be controlled by one set, and means controlled by the other set for taking a record from said recording elements when said elements are in normal position.

12. In a machine of the class described, the combination of item printing wheels, total printing wheels, a common actuator therefor, manipulative amount determining devices controlling said actuator, a pivoted frame supporting record material and an impression platen normally in cooperative relation with the item printing wheels, means for oscillating the frame to cause the platen to take an impression from the item printing wheels, means operated by the oscillation of the pivoted frame for feeding the record material previous to the impression, a reciprocable member supporting said pivoted frame, and a manually operated lever for moving the reciprocable member so as to cause the platen to take an impression from the total printing wheels upon the record material.

13. In a machine of the class described, the combination of a totalizer adapted to have printed impressions made therefrom, item printing elements having their printing line in the same plane as the printing line of the totalizer, an actuator common to the totalizer and the item printing elements, manipulative amount determining devices controlling said actuator, a pivoted member carrying a record material supply roll receiving roll and an impression platen, means for oscillating the member to cause the platen to take an impression from the item printing wheels, and a manually operated total lever for moving the member so as to cause the platen to take an impression from the totalizer.

14. In a machine of the class described, the combination of total printing elements, item printing elements, an actuator common to the total printing elements and the item printing elements, manipulative amount determining devices controlling said actuator, a pivoted frame carrying a record material supply roll and receiving roll, an impression platen mounted to rotate freely upon a stud supported by said pivoted frame so that the record material passes freely thereover during its travel from the supply roll to the receiving roll, means for oscillating the pivoted frame to cause the platen to take an impression from the item printing wheels, and a manually operated total lever for moving said frame so as to cause the platen to take an impression from the total printing elements.

15. In a machine of the class described, the combination of a totalizer adapted to have printed impressions made therefrom, item printing elements, an actuator common to the totalizer and the item printing elements, manipulative amount determining devices controlling said actuator, a pivoted plate carrying a record material supply roll and receiving roll, an impression platen normally in cooperative relation with the item printing elements and supported by said member so that the record material passes thereover in its travel from the supply roll to the receiving roll, means for oscillating the plate to cause the platen to take an impression from the item printing wheels, a manually operated lever for moving the plate to bring the platen into cooperative relation with the totalizer, independent means for oscillating the plate to cause the platen to take an impression from the totalizer, and means operated during the oscillation of the plate for feeding the record material.

16. In a machine of the class described, the combination of a totalizer adapted to have printed impressions made therefrom, item printing elements, an actuator common to the totalizer and the item printing elements, manipulative amount determining devices controlling said actuator, a pivoted member carrying a record material supply roll receiving roll and an impression platen normally in cooperative relation with the item printing wheels and around which the record material passes in its travel from the supply roll to the receiving roll, means for rocking said pivoted member to cause the platen to take an impression from the item printing wheels, a reciprocable member supporting said pivoted member, a manually operated lever for moving the reciprocable member to bring the platen into co-operative relation with the totalizer, and means for rocking the pivoted member during the movement of the reciprocable member to cause the platen to take an impression from the totalizer upon the record material.

17. In a machine of the class described, the combination of a main operating mechanism, accumulating total printing elements, non-accumulating item printing elements, an actuator common to the total printing elements and the item printing elements, manipulative amount determining devices controlling said actuator, a pivoted member carrying a record material supply roll receiving roll, an impression platen normally in cooperative relation with the item printing elements and mounted on the pivoted member so that the record material passes around it when said material travels from the supply roll to the receiving roll, means operated by the main operating mechanism for rocking the pivoted member to cause the platen to take an impression from the item printing wheels, a reciprocable member supporting said pivoted member, a manually operated lever for moving the reciprocable member to bring the platen into cooperative relation with the total printing elements, means independent of the main operating mechanism for rocking the pivoted member during the movement of the reciprocable member to cause the platen to take an impression from the total printing elements upon the record material, and means supported by the reciprocable member and cooperating with the receiving roll for feeding the record material previous to each impression.

18. In a machine of the class described, the combination of a printing totalizer, item printing wheels, an actuator common to the totalizer and the item printing wheels, manipulative amount determining devices controlling said actuator, a sliding plate supporting a pivoted plate carrying a record material supply roll receiving roll and an impression platen so arranged that the record material passes around said platen in its travel from the supply roll to the receiving roll, means for oscillating the pivoted plate independent of the sliding plate to cause the platen to take an impression from the item printing wheels, a manually operated total lever, connections between said total lever and said sliding plate for moving the latter to bring the impression platen into cooperative relation with the totalizer, and means on the pivoted plate for causing the same to be oscillated upon operation of the total lever to cause the platen to take an impression from the totalizer.

19. In a machine of the class described;

the combination of a printing totalizer, item printing wheels, an actuator common to the totalizer and the item printing wheels, manipulative amount determining devices controlling said actuator, a sliding plate supporting a pivoted plate carrying a record material supply roll receiving roll and an impression platen so arranged that the record material passes around said platen in its travel from the supply roll to the receiving roll, means for oscillating the pivoted plate independent of the sliding plate to cause the platen to take an impression from the item printing wheels, a manually operated total lever, connections between said total lever and said sliding plate for moving the latter to bring the impression platen into cooperative relation with the totalizer, means on the pivoted plate for causing the same to be oscillated upon operation of the total lever to cause the platen to take an impression from the totalizer, and means on said sliding plate and cooperating with a ratchet on the receiving roll for feeding the record material upon each oscilliation of the pivoted plate.

20. In a machine of the class described, the combination of a printing totalizer, item printing wheels, an actuator common to the totalizer and the item printing wheels, manipulative amount determining devices controlling said actuator, a sliding plate supporting a pivoted plate carrying a record material supply roll receiving roll and an impression platen so arranged that the record material passes around said platen in its travel from the supply roll to the receiving roll, a camming device engaging a stud on said pivoted plate for rocking the same independent of the sliding plate to cause the platen to take an impression from the item printing wheels upon the record material, a manually operated total lever, connections between said total lever and said sliding plate for moving the latter upon operation of the former to position the impression platen into cooperative relation with the totalizer, means on the pivoted plate for causing the same to be oscillated during the positioning movement of the sliding plate to cause the platen to take an impression from the totalizer, and means on said sliding plate cooperating with means on the receiving roll for feeding the record material upon each oscillation of the pivoted plate.

21. In a machine of the class described, the combination of accumulating total printing elements, non-accumulating item printing elements, an actuator common to the total printing elements and the item printing elements, manipulative amount determining devices controlling said actuator, a pivoted member carrying a record material supply roll and receiving roll, a cylindrical impression platen normally in cooperative relation with the item printing elements and mounted to rotate freely upon a stud supported by said pivoted member so that the record material passes freely thereover in its travel from the supply roll to the receiving roll, a spring cooperating with the pivoted member, a cam device for rocking the pivoted member in one direction to store up power in said spring whereupon said spring rocks said member in the other direction and causes the platen to take an impression from the item printing elements, a manually operated lever for moving said member to bring the platen into cooperative relation with the total printing elements, a flexibly mounted lever supported by said pivoted member and adapted to engage a stationary member during the initial movement of said pivoted member by the total lever to cause the platen to take an impression from the total printing elements, and means operated during the oscillation of said pivoted member for feeding the record material.

22. In a machine of the class described, the combination of accumulating total printing elements, non-accumulating item printing elements, an actuator common to the total printing elements and the item printing elements, manipulative amount determining devices controlling said actuator, a pivoted member carrying a record material supply roll and receiving roll, a cylindrical impression platen normally in cooperative relation with the item printing elements and mounted to rotate freely upon a stud supported by said pivoted member so that the record material passes freely thereover in its travel from the supply roll to the receiving roll, a cam device for rocking said pivoted member in one direction, a spring for rocking said pivoted member in the opposite direction to cause the platen to take an impression from the item printing wheels, a sliding member supporting said pivoted member, a manually operated total lever for moving said sliding member to position said platen in cooperative relation with the total printing elements, a flexibly mounted lever carried by said pivoted member, a stationary member located so as to be in the path of travel of said flexible lever when the platen is moved to the total printing position, means for holding the flexible lever rigid as the platen is moved to the total printing position whereby said flexible lever through its engagement with said stationary member rocks the pivoted member whereupon said spring causes the platen to take an impression from the total printing elements as the flexible lever is disengaged from said stationary member, means for restoring the flexible member to normal position, and means cooperating with the receiving roll for feeding the record material to space the printed impressions thereon.

23. In a machine of the class described, the combination of total printing elements, item printing elements, an actuator common to the total printing elements and item printing elements, manipulative amount determining devices controlling said actuator, a pivoted frame carrying an impression platen mounted to rotate freely upon a stud supported in said frame, said platen being adapted to take an impression from said printing elements upon record material, means for oscillating the pivoted frame to cause the platen to take an impression from the item printing wheels, and a manually operated total lever for moving said frame so as to cause the frame to take an impression from the total printing elements.

24. In a machine of the class described, the combination of total printing elements, item printing elements, an actuator common to the total printing elements and item printing elements, manipulative amount determining devices controlling said actuator, a supply roll and receiving roll for record material, a pivoted frame supporting an impression platen mounted to rotate freely upon a stud supported in said frame so that the record material passes freely thereover during its travel from the supply roll to the receiving roll, means for oscillating the pivoted frame to cause the platen to take an impression from the item printing wheels, a manually operated total lever for moving said frame to cause said platen to take an impression from the total printing elements, and feeding means operated by the oscillations of said pivoted frame for advancing said record material.

25. In a machine of the class described, the combination of total printing elements, item printing elements, an actuator common to the total printing elements and the item printing elements, manipulative amount determining devices controlling said actuator, a supply roll and receiving roll for record material, a pivoted carrier supporting an impression platen mounted to rotate upon a stud mounted in said carrier so as to permit the record material to pass freely over said platen during its travel from the supply roll to the receiving roll, a movable frame supporting said pivoted carrier, means for oscillating the pivoted carrier to cause the platen to take an impression from the item printing elements at each operation of the machine, and a manually operated lever for moving said frame so as to establish an operative relation between said platen and the total printing elements and for effecting movement of the carrier to cause the platen to take an impression from the total printing elements.

26. In a machine of the class described, the combination of total printing elements, item printing elements, an actuator common to the total printing elements and the item printing elements, manipulative amount determining devices controlling said actuator, a supply roll and receiving roll for record material, a pivoted carrier supporting an impression platen mounted to rotate upon a stud mounted in said carrier so as to permit the record material to pass freely over said platen during its travel from the supply roll to the receiving roll, a movable frame supporting said pivoted carrier, means for oscillating the pivoted carrier to cause the platen to take an impression from the item printing elements at each operation of the machine, and a manually operated lever for moving said frame so as to establish an operative relation between said platen and the total printing elements and for effecting movement of the carrier to cause the platen to take an impression from the total printing elements and for effecting a feeding movement of the record material to space the impressions thereon.

27. In a machine of the class described, the combination of total printing elements, item printing elements, an actuator common to the total printing elements and the item printing elements, manipulative amount determining devices controlling said actuator, a supply roll and a receiving roll for record material, a pivoted carrier supporting an impression platen mounted to rotate upon a stud mounted in said carrier so as to permit the record material to pass freely over said platen during its travel from the supply roll to the receiving roll, a movable frame supporting said pivoted carrier, means for oscillating the pivoted carrier to cause the platen to take an impression from the item printing elements at each operation of the machine, and a manually operated lever for moving said frame so as to establish an operative relation between said platen and said total printing elements and for automatically effecting movement of the carrier to cause the platen to take an impression from the total printing elements and for feeding the record material to space the impressions thereon.

28. In a machine of the class described, the combination of item printing wheels, total printing wheels, a common actuator therefor, manipulative amount determining devices controlling the said actuator, a pivoted frame supporting record material and an impression platen normally in cooperative relation with the item printing wheels, a slidable member supporting said pivoted frame, means for automatically oscillating the pivoted frame independent of the slidable member to cause the platen to take an impression from the item printing wheels, and manual means for moving the slidable member to cause the platen to oscillate to take an impression from the total printing wheels upon the record material.

29. In a machine of the class described, the combination of item printing elements, total printing elements, a pivoted frame supporting a record material supply roll receiving roll and an impression platen, a reciprocable member carrying said pivoted frame, automatic means for rocking said frame independent of said member to print items, and a manually operated device for moving said member to cause the frame to be rocked in the same direction as in item printing to print totals.

In testimony whereof I affix my signature.

THOMAS CARROLL.